(12) United States Patent
Di Bonaventura et al.

(10) Patent No.: US 9,566,864 B2
(45) Date of Patent: Feb. 14, 2017

(54) RAIL VEHICLE

(71) Applicant: SIEMENS AKTIENGESELLSCHAFT, Munich (DE)

(72) Inventors: Stefan Di Bonaventura, Buechenbach (DE); Juergen Markl, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 232 days.

(21) Appl. No.: 14/361,727

(22) PCT Filed: Nov. 26, 2012

(86) PCT No.: PCT/EP2012/073575
§ 371 (c)(1),
(2) Date: May 30, 2014

(87) PCT Pub. No.: WO2013/079432
PCT Pub. Date: Jun. 6, 2013

(65) Prior Publication Data
US 2014/0338559 A1 Nov. 20, 2014

(30) Foreign Application Priority Data
Nov. 30, 2011 (DE) .................. 10 2011 087 442

(51) Int. Cl.
*B60L 3/00* (2006.01)
*B61C 17/00* (2006.01)
(52) U.S. Cl.
CPC ............. *B60L 3/00* (2013.01); *B61C 17/00* (2013.01); *B60L 2200/26* (2013.01); *Y02T 90/16* (2013.01)

(58) Field of Classification Search
CPC ................................. B60L 1/00; B60L 3/00
See application file for complete search history.

(56) References Cited

U.S. PATENT DOCUMENTS

| 6,087,739 A | 7/2000 | Jalliffier |
| 6,336,409 B1 | 1/2002 | Devulder |
| (Continued) | | |

FOREIGN PATENT DOCUMENTS

| CN | 1263839 A | 8/2000 |
| CN | 101327799 A | 12/2008 |
| (Continued) | | |

*Primary Examiner* — Zachary Kuhfuss
(74) *Attorney, Agent, or Firm* — Laurence Greenberg; Werner Stemer; Ralph Locher

(57) ABSTRACT

A rail vehicle has at least one bogie and an electrical supply device with a fuse protection apparatus, a distributing apparatus, which is arranged in the rail vehicle interior and which is electrically connected to the fuse protection apparatus. A first housing is arranged in the rail vehicle under floor area and includes electrical components that are electrically connected to the distributing apparatus. The bogie, viewed in the direction of travel of the rail vehicle, is arranged between the distributing apparatus and the first housing. In order to provide a generic rail vehicle for which short cable paths are achieved and doubling of cables is avoided in a bogie area, the fuse protection apparatus is arranged in a second housing different from the first housing. The first and second housings, relative to the direction, are arranged on both sides of the bogie.

9 Claims, 1 Drawing Sheet

(56) References Cited

U.S. PATENT DOCUMENTS

| | | |
|---|---|---|
| 7,859,130 B2 | 12/2010 | Diertens |
| 8,013,469 B2 * | 9/2011 | Masselus ................ B60L 1/003 |
| | | 104/88.04 |
| 2005/0082133 A1 * | 4/2005 | Panetta ................ B60L 3/0023 |
| | | 191/2 |
| 2008/0190318 A1 | 8/2008 | Palais et al. |
| 2010/0006385 A1 | 1/2010 | Aubigny |

FOREIGN PATENT DOCUMENTS

| | | |
|---|---|---|
| CN | 101797921 A | 8/2010 |
| DE | 156242 A1 | 8/1982 |
| EP | 0888944 A1 | 1/1999 |
| EP | 2335994 A1 | 6/2011 |
| GB | 208759 A | 12/1923 |
| JP | 2005112225 A | 4/2005 |
| RU | 2334348 C1 | 9/2008 |
| RU | 96077 U1 | 7/2010 |

* cited by examiner

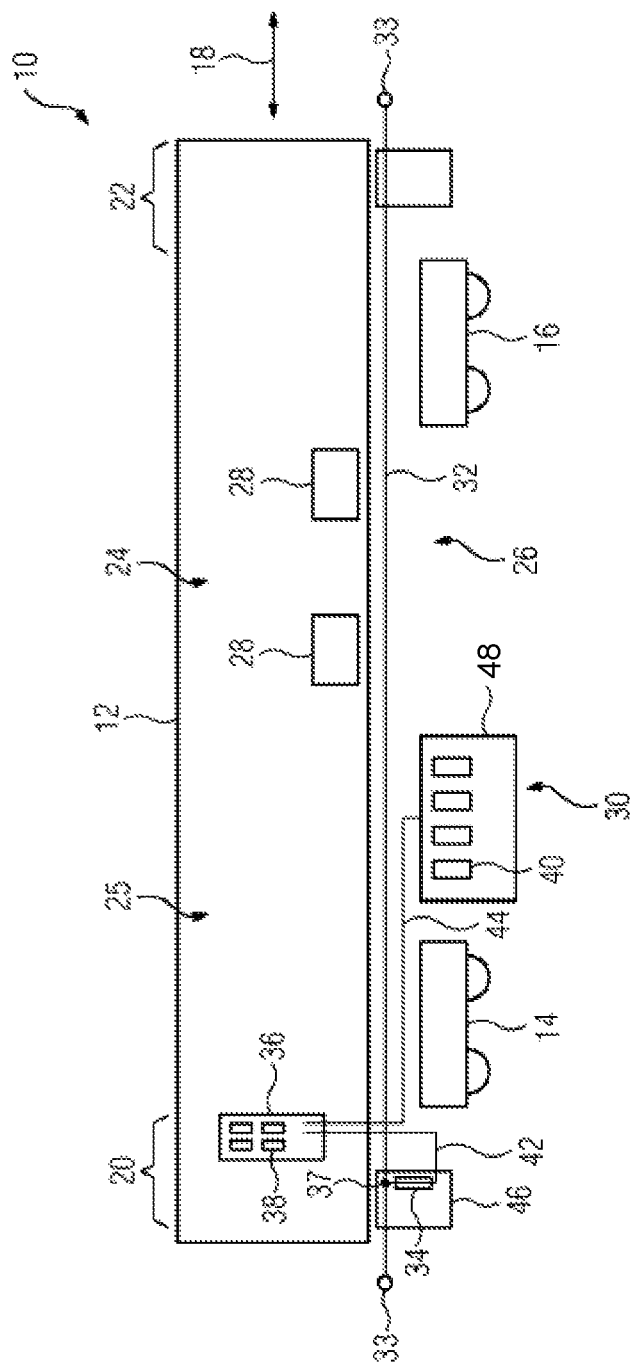

RAIL VEHICLE

BACKGROUND OF THE INVENTION

Field of the Invention

The invention relates to a rail vehicle comprising at least one bogie and a power supply apparatus for supplying electrical power, which power supply apparatus has a fuse protection device, a distributor device which is electrically connected to the fuse protection device and is arranged in the interior of the rail vehicle, and a first housing which is arranged in the under floor area of the rail vehicle and comprises electrical components which are electrically connected to the distributor device, wherein the bogie—as viewed in the direction of travel of the rail vehicle—is arranged between the distributor device and the first housing.

Multiple units are known, in which electrical loads of a carriage unit are operated by means of an electrical power supply, the constituent parts of said electrical power supply in the form of a fuse protection device, a distributor device and a container which is arranged in the under floor area and is connected to said distributor device being distributed within the carriage unit. In consideration of simple operator control by vehicle and servicing personnel, the distributor device is necessarily arranged in the interior of the rail vehicle. For the purpose of concentrating the constituent parts of the electrical power supply apparatus as far as possible in one location, the fuse protection device is conventionally arranged, together with electrical components, in the container in the under floor area of the rail vehicle.

If the bogie is arranged between the distributor device and the container, this common arrangement of the fuse protection device and the electrical components in the container has the disadvantage that dual line paths have to be provided between the container and the distributor device, said line paths additionally being routed through the bogie region for structural reasons. The invention is based on the object of providing a rail vehicle of the generic type, in which short line paths can be obtained and laying lines twice in one bogie region can be avoided.

BRIEF SUMMARY OF THE INVENTION

To this end, the invention proposes that the fuse protection device is arranged in a second housing which is different from the first housing, wherein the first and the second housing—as viewed in the direction of travel of the rail vehicle—are arranged on either side of the bogie. As a result, an advantageous arrangement of the fuse protection device and the distributor device can be obtained on the same side of the bogie—as viewed in the direction of travel of the rail vehicle—, wherein shorter line paths can be obtained and disadvantageous laying of lines through a bogie region can be avoided. Furthermore, an installation space which is provided for the fuse protection device in the first housing and cable insertion means which are required for the fuse protection device in said housing can be advantageously saved.

The rail vehicle can be in the form of a one-part rail-car or it can be intended to form a rail vehicle combination with further rail vehicles. In this case, the rail vehicle can correspond to a single carriage unit of a multiple unit or it can be a single passenger carriage of a locomotive-driven train.

The term "interior of the rail vehicle" is intended to be understood to mean, in particular, the space which is enclosed by the rail vehicle body. The interior of the rail vehicle preferably corresponds to a passenger compartment.

The term "under floor area of the rail vehicle" is intended to be understood to mean, in particular, an area which—as viewed in the vertical direction—is arranged beneath the floor of the rail vehicle body.

The arrangement of a unit "between" two further units and the arrangement of two units "on either side" of a third unit "as viewed in the direction of travel of the rail vehicle" are intended to be understood—in respect of an axis which extends in the direction of travel of the rail vehicle—in accordance with a projection of the units which is oriented perpendicular to this axis.

In comparison to further protection devices which serve to protect local, in particular device-specific, lines, the fuse protection device expediently has the function of a global over current protection means which relates to the entire rail vehicle. In this case, the power supply apparatus expediently has a cable unit which connects the two transition regions of the rail vehicle to one another and from which a line unit to the distributor device branches off at a branch, wherein the fuse protection device is connected directly downstream of the branch. The term "transition regions of the rail vehicle" is intended to be understood to mean regions at the two ends of the rail vehicle in which at least one transition apparatus for creating a transition with an adjacent rail vehicle, such as a mechanical or electrical transition interface for example, is arranged.

The second housing is preferably arranged in the under floor area of the rail vehicle, as a result of which installation space in the interior of the rail vehicle can be saved. In this case, an arrangement can be provided in which the fuse protection device and the distributor device are arranged one above the other—in respect of the vertical direction—, as a result of which particularly short line paths between the fuse protection device and the distributor device can be provided.

The invention further proposes that the distributor device has at least line circuit breakers.

Electrical components of the first housing are advantageously in the form of switching equipment.

The invention is preferably suitable for an electrical power supply apparatus which is intended to supply a low electrical voltage or is designed for carrying a low voltage. In particular, the low voltage can have a value of 110 V. Furthermore, the low voltage can be a DC voltage.

The invention furthermore proposes that the second housing is arranged in one of the transition regions of the rail vehicle. As a result, an arrangement of the second housing can be obtained which is matched to a typical installation site for the distributor device in one of the transition regions of the rail vehicle. In this connection, an existing component can advantageously be used for the function of the second housing since the second housing is formed by a carriage junction box.

An exemplary embodiment will be explained with reference to the drawing, in which

BRIEF DESCRIPTION OF THE SEVERAL VIEWS OF THE DRAWING

The FIGURE illustrates a rail vehicle comprising bogies and an electrical power supply apparatus.

DESCRIPTION OF THE INVENTION

The FIGURE shows a highly schematic side view of a rail vehicle 10. Said rail vehicle 10 can be in the form of a constituent part or carriage unit of a multiple unit, or can be in the form of a passenger carriage. The rail vehicle 10 has a rail vehicle body 12 which is supported on two bogies 14 and 16. The rail vehicle body 12 is connected to rails (not illustrated in any detail) by means of the bogies 14, 16.

The rail vehicle 10 can be divided into three sub regions with respect to the arrangement of the bogies 14, 16 and the direction 18 of travel of the rail vehicle. As viewed in the direction 18 of travel of the rail vehicle, two regions can be defined which are each arranged between a bogie 14 or 16 and one end of the rail vehicle body 12 and are called transition regions 20, 22 of the rail vehicle. A third sub region is defined as a central region 24 which connects the transition regions 20, 22 of the rail vehicle to one another.

The rail vehicle 10 also has a rail vehicle interior 25 which is surrounded by the rail vehicle body 12. The region which is located beneath the floor of the rail vehicle body 12 is called the under floor area 26 of the rail vehicle.

In order to supply power to electrical loads 28 of the rail vehicle 10, said rail vehicle has a power supply apparatus 30. Said power supply apparatus comprises a cable unit 32 which carries, in particular, a DC voltage of 110 V. The cable unit 32—also known as a "busbar" to a person skilled in the art—extends in the longitudinal direction of the rail vehicle body 12 and connects the two transition regions 20, 22 of the rail vehicle to one another. The cable unit 32 has a respective interface 33 in the two transition regions 20, 22 of the rail vehicle, it being possible for an electrical connection to a corresponding cable unit of a further rail vehicle to be established by way of said interfaces. When a rail vehicle combination is created, connection of the corresponding cable units 32 of the rail vehicles, which form the combination, to one another produces a system-wide line.

The power supply apparatus 30 of the rail vehicle 10 further comprises a fuse protection device 34 which is electrically connected to the cable unit 32. A further constituent part of the electrical power supply apparatus 30 is formed by a distributor device 36—also known as an "E board" to a person skilled in the art—which has, in particular, line circuit breakers 38. The distributor device 36 is arranged in the rail vehicle interior 25 and—in respect of the bogie 14—in the transition region 20 of the rail vehicle.

A housing 48 which is arranged in the central region 24 and in the under floor area 26 of the rail vehicle is provided as a further constituent part of the electrical power supply apparatus 30. Electrical components 40 which are, in particular, in the form of switching equipment are arranged in the housing 48. The housing 48 is also known as an "E-switching equipment container" to a person skilled in the art.

The fuse protection device 34 is electrically connected to the distributor device 36 by means of a first line unit 42. Proceeding from the distributor device 36, a second line unit 44 is again laid, said second line unit electrically connecting the distributor device 36 to the electrical components 40 of the housing 48. The electrical components 40 of the housing 48 are operatively connected to corresponding electrical loads 28—by means of line units which are not illustrated in any detail.

The fuse protection device 34, in contrast to the line circuit breakers 38 which are intended to protect device-specific lines of the second line unit 44, serves as a global main fuse of the electrical circuit, which branches off from the cable unit 32, for supplying power to the electrical loads 28.

The fuse protection device 34 is arranged—in respect of the circuit topology of the electrical power supply apparatus 30—between the branch 37 of the cable unit 32 and the distributor device 36. In particular, the fuse protection device 36 is connected directly downstream of the branch 37.

The distributor device 36 and the housing 48 are arranged—as viewed in the direction 18 of the rail vehicle—on either side of the bogie 14. In other words, the bogie 14 is arranged between the distributor device 36 and the housing 48. The second line unit 44 runs between the distributor device 36 and the housing 48, and accordingly through the bogie region.

The branch 37 from the cable unit 32 and the fuse protection device 34 which is connected downstream of said branch are arranged in the transition region 20 of the rail vehicle. The fuse protection device 34 is accommodated in a second housing 46 which is arranged in the transition region 20 of the rail vehicle and corresponds to a carriage junction box. Since the fuse protection device 34 and the distributor device 36 are arranged in the same transition region 20 of the rail vehicle, the first line unit 42 is laid solely in the transition region 20 of the rail vehicle. Said first line unit therefore advantageously does not run through the bogie region. Therefore, cabling can be advantageously simplified by virtue of an arrangement of the first housing 38 and the second housing 46 on either side of the bogie 14.

The invention claimed is:

1. A rail vehicle being a single unit of a train, comprising:
   a power supply apparatus for supplying electrical power to the single unit of the train, said power supply apparatus having a fuse protection device, a distributor device electrically connected to said fuse protection device and disposed in an interior of the rail vehicle;
   a first housing disposed at an under floor area of the rail vehicle and containing electrical components that are electrically connected to said distributor device in the interior of the rail vehicle;
   at least one bogie disposed, relative to a travel direction of the rail vehicle, between said distributor device and said first housing;
   a second housing different from said first housing and containing said fuse protection device;
   said first and second housings, relative to the travel direction of the rail vehicle, being disposed on either side of said at least one bogie.

2. The rail vehicle according to claim 1, wherein said second housing is disposed in the under floor area of the rail vehicle.

3. The rail vehicle according to claim 1, wherein said distributor device comprises line circuit breakers.

4. The rail vehicle according to claim 1, wherein said electrical components of said first housing comprise switching equipment.

5. The rail vehicle according to claim 1, wherein said power supply apparatus is configured to supply an electrical voltage having a value of approximately 110 V.

6. The rail vehicle according to claim 5, wherein the electrical voltage is a DC voltage.

7. The rail vehicle according to claim 1, wherein said second housing is arranged in a transition region of the rail vehicle.

8. The rail vehicle according to claim 1, wherein said second housing is a carriage junction box.

9. The rail vehicle according to claim 1, wherein said power supply apparatus has a cable unit configured to connect two transition regions of the rail vehicle to one another and from which a line unit to said distributor device branches off at a branch, wherein said fuse protection device is connected directly downstream of said branch.

\* \* \* \* \*